(12) United States Patent
Ramirez, Jr.

(10) Patent No.: US 11,569,711 B2
(45) Date of Patent: Jan. 31, 2023

(54) MECHANICAL BRAKE FOR AN ELECTRIC MOTOR

(71) Applicant: MOLON MOTOR AND COIL CORPORATION, Arlington Heights, IL (US)

(72) Inventor: Emilio A. Ramirez, Jr., Roselle, IL (US)

(73) Assignee: MOLON MOTOR AND COIL CORPORATION, Arlington Heights, IL (US)

(*) Notice: Subject to any disclaimer, the term of this patent is extended or adjusted under 35 U.S.C. 154(b) by 0 days.

(21) Appl. No.: 16/919,849

(22) Filed: Jul. 2, 2020

(65) Prior Publication Data

US 2020/0336042 A1 Oct. 22, 2020

Related U.S. Application Data

(63) Continuation of application No. 16/164,279, filed on Oct. 18, 2018, now Pat. No. 10,784,742.

(Continued)

(51) Int. Cl.
*B24B 23/02* (2006.01)
*H02K 7/102* (2006.01)
(Continued)

(52) U.S. Cl.
CPC ........... *H02K 7/1028* (2013.01); *F16D 59/00* (2013.01); *F16D 59/02* (2013.01); *F16D 63/006* (2013.01);
(Continued)

(58) Field of Classification Search
CPC ...... H02K 7/1028; H02K 7/116; H02K 17/08; H02K 17/32; F16D 59/00; F16D 59/02;
(Continued)

(56) References Cited

U.S. PATENT DOCUMENTS 4,551,496 A  11/1985 Renlund et al.
5,306,989 A * 4/1994 Feller, Jr. ............... F16D 55/02
                                                  188/171

(Continued)

FOREIGN PATENT DOCUMENTS

EP   1689067 A1   8/2006
EP   2096330 A1   9/2009

OTHER PUBLICATIONS

Mar. 29, 2019 Extended Search Report issued in European Patent Application No. 15200864.9.

(Continued)

*Primary Examiner* — Cortez M Cook
(74) *Attorney, Agent, or Firm* — Oliff PLC

(57) ABSTRACT

The present disclosure relates to mechanical braking mechanisms used in electric motor applications. The present braking mechanisms may be configured as non-back-drivable mechanical brakes and provide immediate braking of the motors. According to one embodiment, a mechanical brake assembly for an electric motor may include a female disk including a groove and an abutment and a male disk including a projection, the male disk being in mechanical communication with a rotor of the electric motor. When the electric motor is energized, the projection of the male disk is configured to rotate with the rotation of the rotor of the electric motor, but when the electric motor is de-energized, the projection of the male disk is configured to travel within the groove of the female disk and abut the abutment of the female disk, thereby reducing the rotation of the rotor of the electric motor.

20 Claims, 8 Drawing Sheets

Related U.S. Application Data

(60) Provisional application No. 62/574,025, filed on Oct. 18, 2017.

(51) Int. Cl.
| | |
|---|---|
| *F16D 63/00* | (2006.01) |
| *F16D 59/00* | (2006.01) |
| *H02K 7/116* | (2006.01) |
| *H02K 17/08* | (2006.01) |
| *H02P 3/26* | (2006.01) |
| *H02P 25/04* | (2006.01) |
| *H02K 17/32* | (2006.01) |
| *F16D 59/02* | (2006.01) |
| *F16D 125/58* | (2012.01) |
| *F16D 121/22* | (2012.01) |

(52) U.S. Cl.
CPC ............. *H02K 7/116* (2013.01); *H02K 17/08* (2013.01); *H02K 17/32* (2013.01); *H02P 3/26* (2013.01); *H02P 25/04* (2013.01); *F16D 2121/22* (2013.01); *F16D 2125/585* (2013.01); *F16D 2200/0004* (2013.01); *F16D 2200/0034* (2013.01)

(58) Field of Classification Search
CPC ............... F16D 63/006; F16D 2121/22; F16D 2125/585; F16D 2200/0004; F16D 2200/0034; H02P 3/26; H02P 25/04; B24B 23/022
See application file for complete search history.

(56) References Cited

U.S. PATENT DOCUMENTS

| | | | |
|---|---|---|---|
| 2010/0078187 A1* | 4/2010 | Chen ..................... | B24B 23/022 173/213 |
| 2013/0186717 A1 | 7/2013 | Muramatsu et al. | |

OTHER PUBLICATIONS

Feb. 14, 2020 Office Action Issued in U.S. Appl. No. 16/164,279.
May 26, 2020 Notice of Allowance Issued in U.S. Appl. No. 16/164,279.

* cited by examiner

LOCKING DISK

METAL WASHER

SPRING        DISC BRAKE BAR        BRAKE HOUSING

METAL WASHER

MECHANICAL BRAKE FOR AN ELECTRIC MOTOR

CROSS REFERENCE TO RELATED APPLICATIONS

This patent application claims the benefit of U.S. patent application Ser. No. 16/164,279 filed on Oct. 18, 2018, which claims the benefit of U.S. Prov. Ser. No. 62/574,025 filed Oct. 18, 2017. These applications are incorporated by reference in their entireties herein.

TECHNICAL FIELD

The present application generally relates to electric motors and devices and systems utilized in an alternating current (AC) motor. In some embodiments, the present devices and systems relate to mechanical brakes, brake assemblies for electric motors, and gear motors with a non-back-drivable mechanical brake device and assembly.

BACKGROUND

Direct-current (DC) electrical motors and alternating-current (AC) electrical motors are used in a number of different applications. It is, of course, generally known to use electrical motors, such as alternating current (AC) induction motors in all manner of items and applications, from appliances, to tools to conveyor belts. A common single-phase AC motor is the split-phase induction motor, commonly used in major appliances such as air conditioners and clothes dryers. Compared to a shaded pole motor, these motors provide much greater starting torque. One variation of an AC motor is the permanent-split capacitor (PSC) motor. Also known as a capacitor-run motor, this type of motor uses a non-polarized capacitor with a high voltage rating to generate an electrical phase shift between the run and start windings. PSC motors are frequently used in variable torque applications (like blowers, fans, and pumps) and other cases where variable speeds are desired.

Certain types of motors (e.g., reversible motors) may be characterized by a feature known as "back-drive-ability," which can be defined as the degree of ease of which a motor or gear motor can be driven by its attached load when power is removed from the motor, i.e., the degree of inertia after the power is turned off. Thus, back-drive-ability can be defined by the degree of inertia after the power is turned off. Easy back-drive-ability can be especially useful when moving high-mass loads, where the motor "coasts" as the heavy load comes to a rest. Easy back-drive-ability can also prevent the load from causing damage to the gear motor in some applications. On the other hand, easy back-drive-ability in some cases can be hazardous, such as in the case of motors used for circular saws or radial arm saws. For instance, after power to a saw is turned off, the saw blade may continue to rotate for a long period of time, which, of course, can be a safety hazard.

In many applications, it is usually essential that an AC induction motor be stopped quickly and precisely, so that there will be no significant over-travel. For example, alternating current motors are used to drive radial arm saws; after the motor is de-energized, it may require three to ten seconds for the motor driven saw blade to "coast" before the saw blade is brought to a stop. During this coast down period, the operator must avoid inadvertent contact with the rotating blade for obvious safety reasons. The operator also is restricted from re-adjusting the saw blade until it comes to a complete stop. As a result of the coasting or over-travel, productivity is reduced. Another example would be an industry where production relies on the use of a conveyor belt to move products during the various stages of production. For instance, during food production, it may be important to stop the belt at a precise moment for addition of an ingredient, or application of another ingredient. If the conveyor is not stopped at the exact moment and immediately, or if any over-travel occurs, an ingredient or step in the food process may be missed, resulting in an inferior or faulty product.

In many applications, it may be important that a motor is configured to provide precise control of the movement of various components without unpredictable back-drive-ability. For example, some conveyor belts controlled by motors may need to move products during various stages of production and to stop the belt at a precise moment for the addition of an ingredient. Otherwise, if any over-travel or back-drive-ability occurs, an ingredient may be missed or applied at a wrong place, resulting in inferior or faulty products.

Examples of other applications where an AC motor may be useful is in the movement, specifically, opening and closing of valves. In some instances, there is a need to hold a shaft in position in an application such as a "valve actuator," where a load is driven by a motor when the same is energized by applying an AC voltage to the motor's potential. As such, when the motor is energized, the rotor will rotate and the input rotor shaft pinion through the "rotor assembly" drives cluster gears (e.g., stages 1, 2 and 3 shown in FIG. 1). The $3^{rd}$ stage cluster gear drives the $4^{th}$ stage output gear to which the shaft is connected to a valve actuator, for example. At the end of the travel, the motor is de-energized, stopping the motor in position. Because of the greater torque of the actuator, there is a tendency for the output shaft to be back driven as the power of the motor is turned off. This will create a gap in the closing of the valve. Sensors will indicate when the valve is not fully closed, triggering the motor to turn on again, thus repeating that cycle and eventually causing a failure in the system.

Another example of a motor being used for more precise positioning is the field of valve actuators. With valve actuators, movement of flappers or other elements of a valve should allow positioning such that, in a closed valve position, the valve does not leak. Thus, to maintain the valve in the closed position, a valve actuator should be controlled by a motor having little or no back-drive-ability when power is removed from the motor. Otherwise, a load, which may be a fluid, might back-drive the flapper such that unwanted leakage occurs. During inertial motion or back-driving, the driven output shaft (load) becomes the driving one and the driving input shaft (load) becomes the driven one. There are many gear drive applications where output shaft driving is undesirable. In order to prevent it, different types of brake or clutch devices are used.

To prevent back-drive-ability, a braking system may be used with the motor. A standard brake device used in the gear motor industry is a disk cork brake. However, this type of brake only stops the motor in position, but friction of the cork brake cannot hold an overhung load, or a spring back load, especially if that load is greater, which causes the shaft to be back-driven at the end of travel when the power is turned off.

Another standard brake is called a clapper-type brake, which is a positive locking type brake. The clapper-type brake holds an overhung load in position, but this brake only applies to a shaded pole-type of motor, which is unidirectional in nature. Therefore, use of the clapper-type brake is not as useful in a reversible or multi-directional PSC motor.

Solenoid brakes are sometimes used for braking an electric motor. In this case, the solenoid brake is a motor itself and may work against the electric motor, thereby causing excessive heat in many cases. Therefore, instead of electrical brakes, mechanical braking systems may be incorporated into a motor system.

Mechanical braking typically relies upon the engagement of one or more frictional members, such as a brake drum and brake band (or caliper), or a clutch disk and clutch plate. This type of braking device, being essentially mechanical, requires a time interval to bring the machinery to a stop. Moreover, mechanical braking devices wear rather rapidly and, therefore, require frequent adjustment, maintenance, and repair.

Another example of a conventional mechanical brake having both mechanical and electrical components is a brake that may be located outside of a support structure that supports the motor, whereby a portion of the rotating shaft that extends out of the support structure is engaged for braking. This conventional brake includes a motor that moves forward and backward and pushes against a bushing fixed to the exposed shaft. However, a problem with this arrangement is that, during braking, the force applied to the shaft is applied to the bushing in one direction and may cause the axial misalignment of the rotor.

Therefore, it is desirable to employ a braking mechanism useful for immediately stopping an AC motor, such as a PSC reversible motor, or other types of motors, in whatever application the motor is being used to eliminate, or at least reduce, over-travel to non-significant intervals to thereby reduce or prevent the output shaft of the motor from being back-driven. Also, a need exists for improved braking devices for providing immediate braking in an efficient manner and resulting in longer life of braking parts and less or zero maintenance and repair.

A need, therefore, exists for improved devices and systems and methods for braking for a motor, such as an AC induction motor. Specifically, a need exists for a device providing more accurate and immediate braking of an AC motor, such as a PSC motor used in a variety of industries and applications.

Moreover, a need exists for improved devices and systems for use in the efficient and immediate braking for an AC motor, resulting in longer part wear and less maintenance and repair.

SUMMARY

The present disclosure relates to a braking mechanism and assembly for use in an AC permanent split capacitor (PSC) reversible motor application, and specifically, a non-back-drivable mechanical brake. The present braking mechanism provides an advantage of immediate braking of the motor. For example, the present brake mechanism may be useful in a valve actuator application in which a reversible motor is employed to ensure opening of a valve and complete and immediate closing of the valve. The present braking mechanism may also be useful in a conveyor application, where immediate and accurate stopping of an operating mechanism is desired.

To this end, in an embodiment of the present disclosure, a mechanical braking assembly is provided. According to one embodiment, a mechanical brake assembly for an electric motor may include a female disk, which includes a curved groove and an abutment. The mechanical brake assembly also includes a male disk, which includes a projection and is attached to a rotor of the electric motor. When the electric motor is energized, the projection of the male disk is allowed to rotate uninterrupted with the rotation of the rotor of the electric motor. However, when the electric motor is not energized, the projection of the male disk travels within the curved groove of the female disk and abuts the abutment of the female disk, thereby stopping the rotation of the rotor of the electric motor. Also, the mechanical braking assembly comprises a housing containing the following components: a disc brake bar, at least two metal washers, a compression spring disposed between the metal washers and a locking washer. The other brake member, which is the male disc brake, is attached to the back of the rotating rotor via the rotor shaft.

In accordance with another embodiment of the present disclosure, a method of operating an electric motor is disclosed. The method may include providing electrical power to a stator of an electric motor to create a magnetic field. Also, the method includes applying a first force on a rotor of the electric motor to move the rotor in a first direction along an axial path. The rotor is positioned offset (intentionally misaligned) from the stator at rest in a steady state, such that the force applied to the rotor moves the rotor in the axial direction to achieve a greater extent of alignment with the stator. Moving the rotor to achieve a greater extent of alignment causes a projection of a male disk attached to the rotor to exit a groove of a female disk to allow uninterrupted rotation of the rotor. When electrical power is no longer provided to the stator, the method further comprises applying a second force on the rotor to move the rotor in a second direction opposite to the first direction to cause the projection to enter the groove of the female disk and abut an abutment of the female disk, thereby stopping the rotation of the rotor of the electric motor.

It is therefore an advantage and objective of the present disclosure to provide more accurate and immediate braking of a motor. It is a further advantage and objective of the present disclosure to provide an improved, non-back-drivable braking mechanism for use in a gear motor, resulting in less part wear, maintenance, and repair. Additional features and advantages of the present disclosure are described in, and will be apparent from, the detailed description of the presently preferred embodiments and from the drawings.

In another embodiment, the present disclosure relates to mechanical braking mechanisms used in electric motor applications. The present braking mechanisms may be configured as non-back-drivable mechanical brakes and provide immediate braking of the motors. According to one embodiment, a mechanical brake assembly for an electric motor may include a female disk including a groove and an abutment and a male disk including a projection, the male disk being in mechanical communication with a rotor of the electric motor. When the electric motor is energized, the projection of the male disk is configured to rotate with the rotation of the rotor of the electric motor, but when the electric motor is de-energized, the projection of the male disk is configured to travel within the groove of the female disk and abut the abutment of the female disk, thereby reducing the rotation of the rotor of the electric motor.

It is, therefore, an advantage and objective of the present disclosure to provide more accurate and immediate braking of an AC motor, such as a PSC motor used in a variety of industries and applications.

It is a further advantage and objective of the present disclosure to provide an improved, non-back-drivable braking mechanism and assembly for use in gear motor, resulting in longer part wear, less maintenance and repair.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accordance with the present disclosure, by way of example only, not by way of limitation. In the figures, like reference numerals refer to the same or similar elements.

DETAILED DESCRIPTION

The present disclosure relates to a braking assembly for use in a motor. Specifically, the present disclosure relates to a non-back-drivable mechanical brake assembly for use in an AC PSC motor capable of rotating in a clockwise direction and a counter-clockwise direction. Because a PSC motor is capable of operating at different speeds by allowing higher levels of slip and is capable of operating within a variety of applications, including, for example, valve actuator (i.e., valve opening and closing) applications, conveyor belt applications, fans and blowers, air conditioners, coolers, furnaces, unit heaters, roof ventilators, dehumidifiers, garage door openers, and other applications that require low starting torque and current. Referring to the figures, wherein like numerals refer to like parts, FIGS. 1-9 depict various embodiments of systems and assemblies for braking electric motors to prevent the motor from back-driving and illustrate a non-back-drivable mechanical brake assembly useful in an AC motor application.

Figure 1:
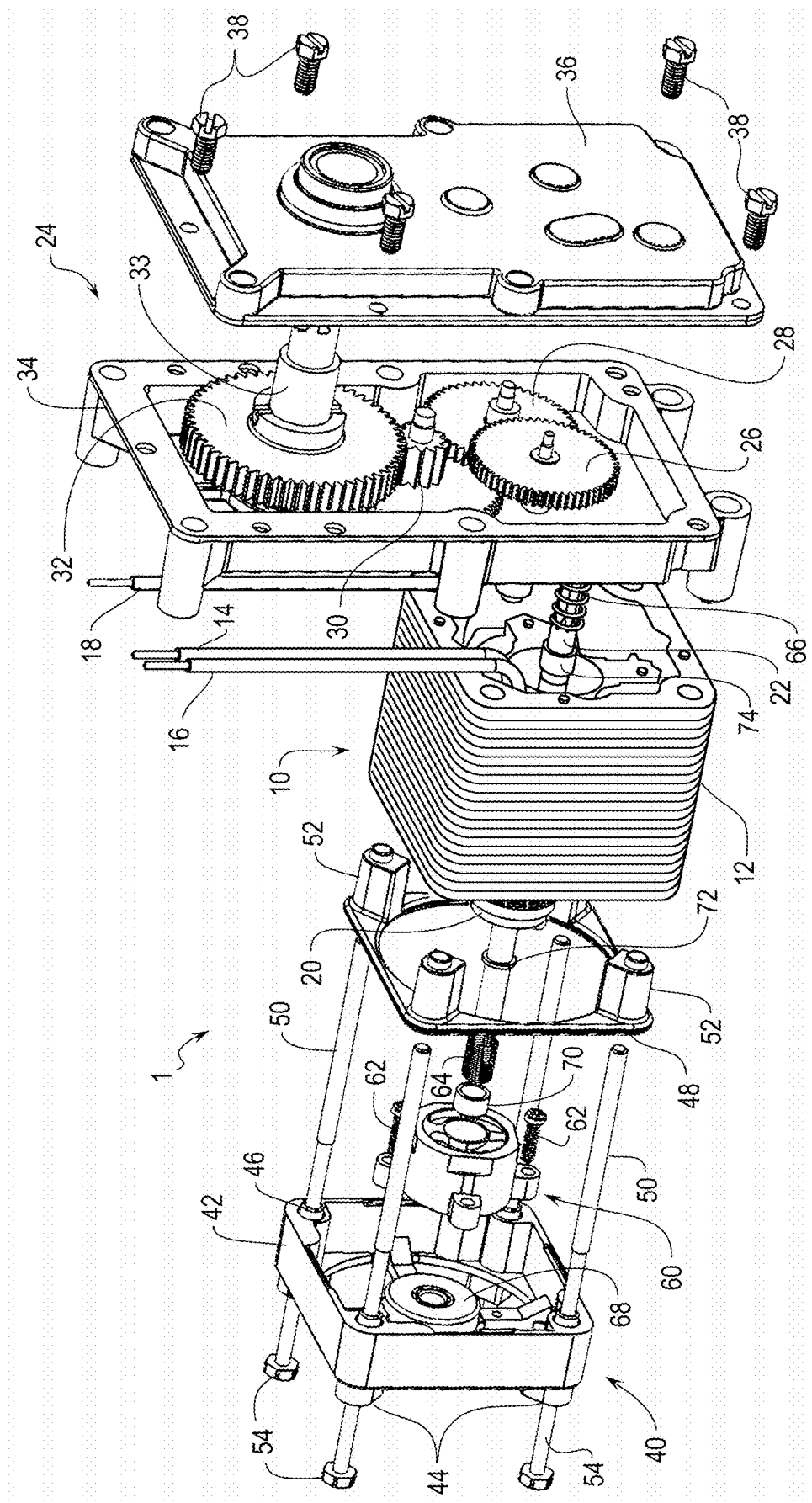
FIG. 1 illustrates an exploded view of a system having a mechanical braking assembly for use with a motor for driving a gear assembly, according to embodiments of the present disclosure.

FIG. 1 is an exploded view showing an embodiment of a system 1 having a motor 10 that is configured to drive a gear assembly 24. According to some implementations, the motor 10 may be an AC PSC reversible motor. The motor 10 includes a rotating shaft 22 that is configured to be stopped when the motor is no longer energized. The stopping action is performed by a mechanical brake assembly 60 having components that may be directly or indirectly attached to the shaft 22 of the motor 10. More particularly, the stopping action prevents the motor 10 from being back-driven.

The motor 10 includes a stator assembly 12 having electrical conductors 14, 16, 18, which provide electrical power to the stator assembly 12 to create a magnetic field. The conductors include a "common" conductor 14, a "primary" conductor 16 (for one direction of rotation), and a "secondary" conductor 18 (for a reverse direction of rotation).

The motor further includes a rotor 20 (shown only partially in FIG. 1) positioned at least partially within the stator assembly 12. The rotor 20 is configured to rotate in response to the magnetic field created by the stator assembly 12. The rotor 20 includes a shaft 22 defining a longitudinal axis. The shaft 22 includes a rear section extending from a rear side of the rotor 20 and a front section extending from a front side of the rotor 20. The term "back" or "rear," as used in the present disclosure, may refer to positions located closer to the left side of the illustration of FIG. 1. The term "front" may refer to positions located closer to the right side of FIG. 1.

In some embodiments, the system 1 may be positioned in a horizontal orientation such that the axis of the shaft 22 is horizontal, such as shown in FIG. 1. In other embodiments, the system 1 may be positioned in a vertical orientation such that the axis of the shaft 22 is vertical.

The shaft 22 of the rotor 20 engages the gear assembly 24. In the embodiment shown, the gear assembly 24 comprises a first stage gear 26 that directly engages the shaft 22. The first stage gear 26 engages a second stage gear 28, which in turn engages a third stage gear 30, which in turn engages an output gear 32. According to the illustrated gear assembly 24 having an even number of gears, a clockwise rotation of the shaft 22 results in a clockwise rotation of the output gear 32, and, similarly, a counter-clockwise rotation of the shaft 22 results in a counter-clockwise rotation of the output gear 32.

The output gear 32 is connected to an output shaft 33. According to some applications, the output shaft 33 of the gear assembly 24 may be configured to operate a valve actuator. Thus, when the output shaft 33 is rotated in a first direction, the valve actuator may be configured to close a passageway, such as by positioning a flapper within the passageway to prevent fluid (e.g., liquid or gas) from passing through the passageway. Also, when the output shaft 33 is rotated in the opposite direction, the valve actuator may be configured to open the passageway, such as by withdrawing the flapper away from the passageway to allow the fluid to flow. In order to keep the valve actuator from back-driving when the valve has been closed, the mechanical brake assembly 60 allows the flapper to stay firmly in a closed position when the task of closing the valve is complete and the power to the motor 10 is shut off.

The gear assembly 24 may further include a gearbox 34 and gearbox cover 36 for protecting the gears 26, 28, 30, 32 from the environment. The gearbox cover 36 may be attached to the gearbox 34 using a number of gearbox screws 38.

With this motor and gear arrangement, a large back-driving force may be introduced by the output shaft 33 of the system 1, particularly when the motor and gear arrangement is used with a valve actuator. Since a reversible motor is typically used with valve actuators to allow movement in one direction to open the valve and movement in the other direction to close the valve, an unwanted back-driving force is likely to occur due to torque and the pressure of the fluid exerting forces on the valve. When power to the motor 10 is shut off, the back-driving torque is applied to the output shaft 33. In an application where the gear ratio is low, it may even be possible to manually turn the output shaft 33 in a reverse direction to back-drive the motor 10.

However, by installing a braking system as disclosed herein, the motor 10 may be able to close a valve and lock the valve in a closed position when the power is turned off. Because of inertia, a torque of about 1000 inch-pounds may be back-driven on the output shaft 33. Thus, without a braking system, the valve actuator may inadvertently release pressure on the flapper of the valve, which may cause leakage of the fluid.

The system 1 of FIG. 1 further includes a bearing bracket assembly 40, which is configured to support the stator assembly 12 and the gearbox 34 in a fixed manner. The bearing bracket assembly 40 includes a back bracket 42 configured to support the mechanical brake assembly 60. Four feet 44 are arranged at the four corners of the back bracket 42 for providing a stand-off from a support structure (not shown) to which the bearing bracket assembly 40 is attached. The four corners of the back bracket 42 also include openings 46.

The bearing bracket assembly 40 may further include a front bracket 48. The back bracket 42 and front bracket 48 are separated from each other using four, elongated screws 54. Also, the front bracket 48 is separated from the stator assembly 12 by shroud stand-offs 52. From back to front, the screws 54 are configured to pass through the four feet 44, the four openings 46 in the back bracket 42, the front bracket 48 having openings in the four corners of the stator assembly 12, and openings in the gearbox 34. The elongated screws 54 may include threads 50 for engaging corresponding threads in the gearbox 34 via a tapped thread on the four bosses of the gearbox 34 aligning with the stator 12. Other hardware may be used as needed for physically holding the various components of the system 1 together.

Embodiments of mechanical braking systems and assemblies are described hereafter. The mechanical brakes may be applied in any suitable type of motor, either with gears (such as the gearbox assembly 24 mentioned above) or without gears. Also, although the embodiments described below may be intended for use with an AC PSC reversible motor, the mechanical braking systems may also be used with other types of motors with any necessary alterations to the system 1 as would be understood by one of ordinary skill in the art with an understanding of the features of the present disclosure described herein.

The mechanical brake assembly 60, according to some embodiments of the present disclosure, may include a housing that is held in place against a support platform 68 by brake screws 62 inserted through ears of the housing and openings in the support platform 68.

Also shown in FIG. 1 are a rear spring 64 and a front spring 66. The springs 64, 66 are configured to allow the rotor 20 to move axially along the longitudinal axis created by the shaft 22. The movement can be made backwards or forwards along the axis. In some embodiments, each of the springs 64, 66 may be replaced with two or more springs and/or the springs 64, 66 may be replaced with springs having different coil characteristics or compression forces as needed to apply a sufficient force in forward and backward directions to keep the rotor 20 within a certain linear range. The springs 64, 66 are used to maintain the rotor 20 within this range of linear motion along the longitudinal axis, allowing movement with respect to the stationary stator 12.

It should be noted that the springs 64, 66 and other hardware along the axis of the shaft 22 are configured to maintain the rotor 20 in a steady-state, offset position with respect to the stator 12. In other words, when the motor 10 is not energized, the laminations of the rotor 20 will not be aligned with the laminations of the stator 12. This non-energized, steady state, or "home" position may correspond to a braking, or locked, condition whereby the shaft 22 may not be back-driven. However, as describe below, when the motor 10 is energized, the stator 12 develops its magnetic field and the rotor 20 follows its natural tendencies to rotate and move axially such that the laminations of the rotor 20 are more closely aligned with the laminations of the stator 12.

The system 1 further includes spacers that provide surfaces from which the springs 64, 66 can be biased. The spacers are oriented in the axial direction next to the springs 64, 66. The spacers may be ring shaped and may consist of plastic or other suitable material.

For example, a first rear spacer 70 and a second rear spacer 72 are positioned around the rear section of the shaft 22, adjacent to the rear spring 64. The first rear spacer 70 is positioned loosely around the rear section of the shaft 22 on a rear side of the rear spring 64. The first rear spacer 70 may be arranged inside the mechanical brake assembly 60 and may press up against the support platform 68 of the back bracket 42.

The second rear spacer 72 is attached securely on the rear section of the shaft 22 on a front side of the rear spring 64. The second rear spacer 72 may be secured against a male disk (described in detail below), which is connected to a rear side of the rotor 20.

In one embodiment, the first rear spacer 70 may have a width of 0.156 inches and the second rear spacer 72 may have a width of 0.031 inches.

With respect to the front spring 66, a first front spacer 74 and a second front spacer (blocked from view in FIG. 1 by the gearbox 34) are positioned around the front section of the shaft 22, adjacent to the front spring 66. The first front spacer 74 is attached securely on the front section of the shaft 22 on a rear side of the front spring 66 and adjacent to the rotor 20. The second front spacer is positioned loosely around the front section of the shaft 22 on a front side of the front spring 66. According to one embodiment, the first front spacer 74 may have a width of 0.187 inches and the second front spacer may have a width of 0.062 inches.

Operation of the motor 10 and mechanical brake assembly are described hereinafter. As mentioned above, the rotor 20 will be in a rest position that is offset slightly (toward a back position) such that the laminations of the rotor 20 and stator 12 are not in alignment. When the motor 10 is energized (i.e., when electrical power is applied to the electrical conductors 14, 16, 18), the rotor 20 is rotated either clockwise or counter-clockwise about its axis, depending on the polarity of the AC power applied. A force is applied to the rotor 20 configured such that the laminations of the rotor 22 will tend to move to align with the laminations of the stator assembly 12. Hence, when the rotor 20 is rotating, the rotor 20 will move in a forward direction to align the laminations of the rotating rotor 20 to that of the stationary stator 12 laminations.

When originally positioned in the rest (or steady state) position, the rear spring 64 and front spring 66 will move the rotor 20 to the offset, rearward position, which corresponds to a stop position or home position as defined in more detail below. However, when rotating, the rotor 20 is assisted by the rear spring 64 to consistently overcome and facilitate the rotor 20 to move toward a forward (more aligned) position, which corresponds to an operating position.

Figure 2:
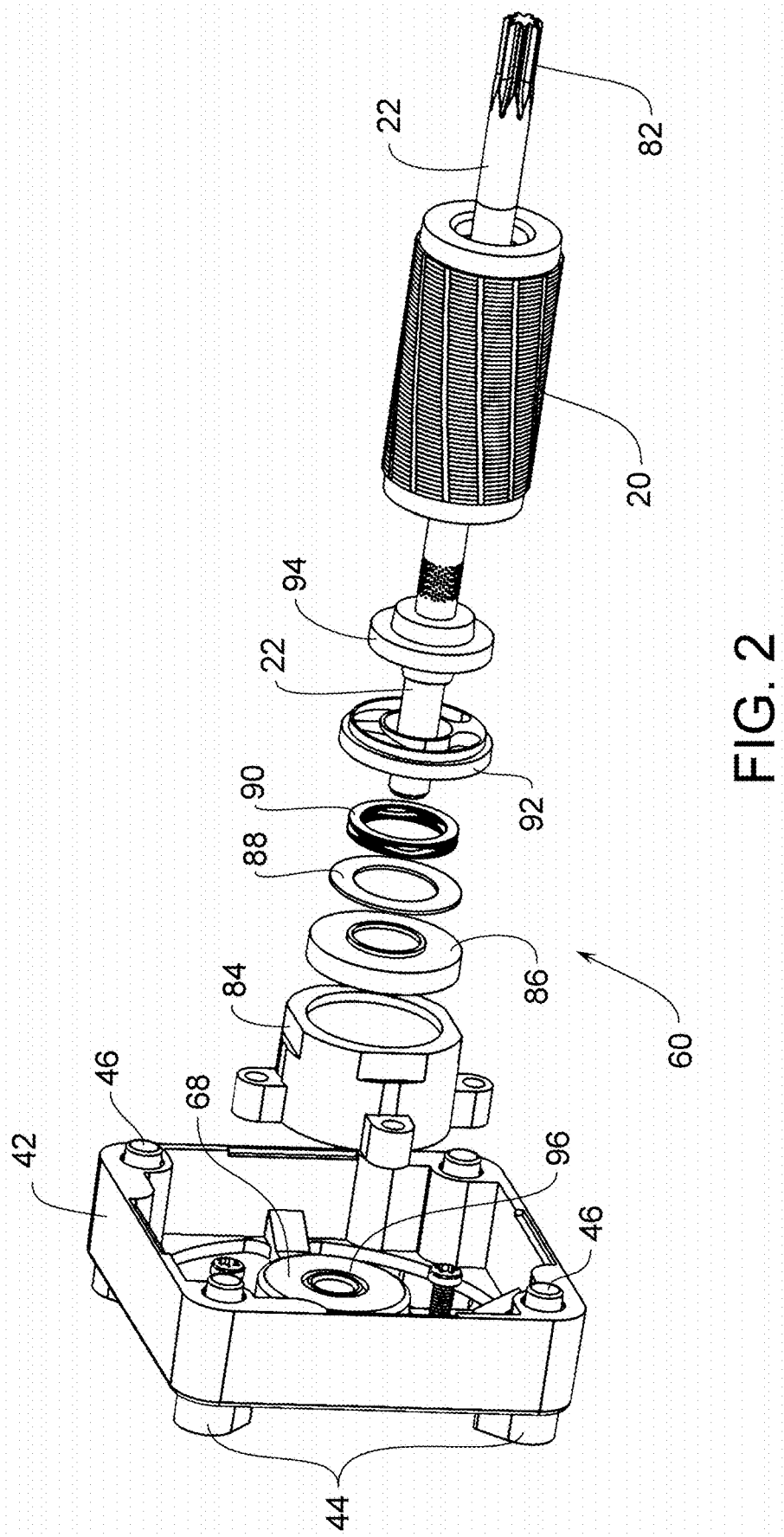
FIG. 2 illustrates an exploded front view of the mechanical brake assembly shown in FIG. 1 with the back bracket and rotor also shown in FIG. 1, according to some embodiments of the present disclosure.

FIG. 2 is an exploded view showing an embodiment of the mechanical brake assembly 60. Also shown in FIG. 2 are the back bracket 42, the rotor 20, the back section of the shaft 22, and the front section of the shaft 22. The front section of the shaft 22 includes a hobbed pinion 82, which is configured to engage with the first stage gear 26 shown in FIG. 1. The support platform 68 is configured to support a brake housing 84 of the mechanical brake assembly 60.

In this embodiment, the mechanical brake assembly 60 includes the brake housing 84, a disk stop 86, one or more washers 88, a compression spring 90, a female disk 92, and a male disk 94. The one or more washers 88 are located between the disk stop 86 and female disk 92 on either or both sides of the compression spring 90.

Each of the components of the mechanical brake assembly 60 includes a center opening for receiving the shaft 22. The center openings are circular having an axis aligned with the axis of the shaft 22. The inside diameter of the openings of the disk stop 86, washer 88, and compression spring 90 is greater than the outside diameter of the shaft 22, which allows space for the first rear spacer 70 and the rear spring 64 (not shown in FIG. 2). A rear end of the rear spring 64 may be positioned to abut the first rear spacer 70, which in turn is supported against the support platform 68.

When the mechanical brake assembly 60 is assembled, the disk stop 86, washer 88, compression spring 90, and female disk 92 are positioned within the brake housing 84. When assembled, the female disk 92 may be able to rotate to a small degree within the brake housing 84.

In the assembled state, the shaft 22 is positioned through the center openings of the female disk 92, compression spring 90, washer 88, and stop disk 86, and further extends through an axial opening 96 in the support platform 68.

The male disk 94 is configured to move separately from the female disk 90, which remains relatively fixed. More specifically, the male disk 94 may be affixed to the shaft 22 in a position directly adjacent to the rotor 20 or in other embodiments may be connected directly to the rotor 20. Thus, the male disk 94 is configured to rotate with the rotation of the shaft 22.

The female disk 92 and the male disk 94 may be plastic or other suitable material. Also, the housing 84 and disk stop 86 may also consist of plastic or other suitable material. The washer 88 and compression spring 90 may consist of metal or other suitable material.

Figure 3:
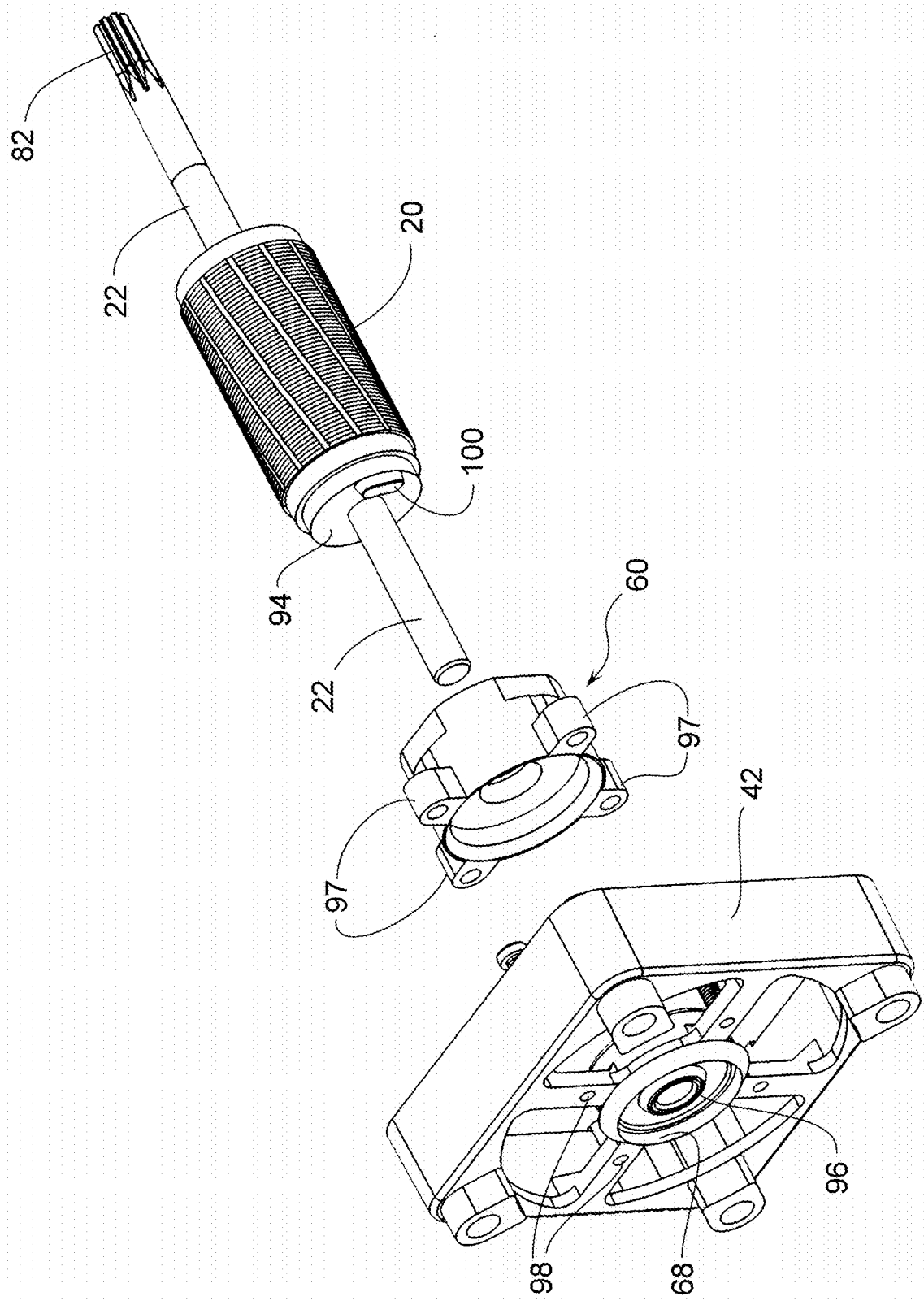
FIG. 3 illustrates an exploded back view of the back bracket, mechanical brake assembly, and rotor shown in FIG. 1, according to some embodiments of the present disclosure.

FIG. 3 is an exploded rear view of the back bracket 42, mechanical brake assembly 60, and rotor 20. The mechanical brake assembly 60 is shown in its assembled state. In this illustration, the male disk 94 is shown in its operating position on the shaft 22, inserted adjacent to the rotor 20. Furthermore, FIG. 3 shows a projection 100 that projects out from a surface of the male disk 94. During braking, the projection 100 is configured to engage with the relatively stationary female disk 92 to stop the rotation of the shaft 22 and rotor 20.

The projection 100 may be formed to have a tapered wall. For example, in one embodiment, the taper may be about 18°. This angle may correspond to a similar taper in an abutment of the female disk 92, as described in more detail below.

The brake housing 84 is held in place by the support platform 68. For example, the brake housing 84 may be connected to the support platform 68 by screws inserted through openings in ears 97 of the housing 84 and through corresponding screw holes 98 in the support platform 68. In other implementations, attachment devices other than screws may be used for this connection.

Figure 4:
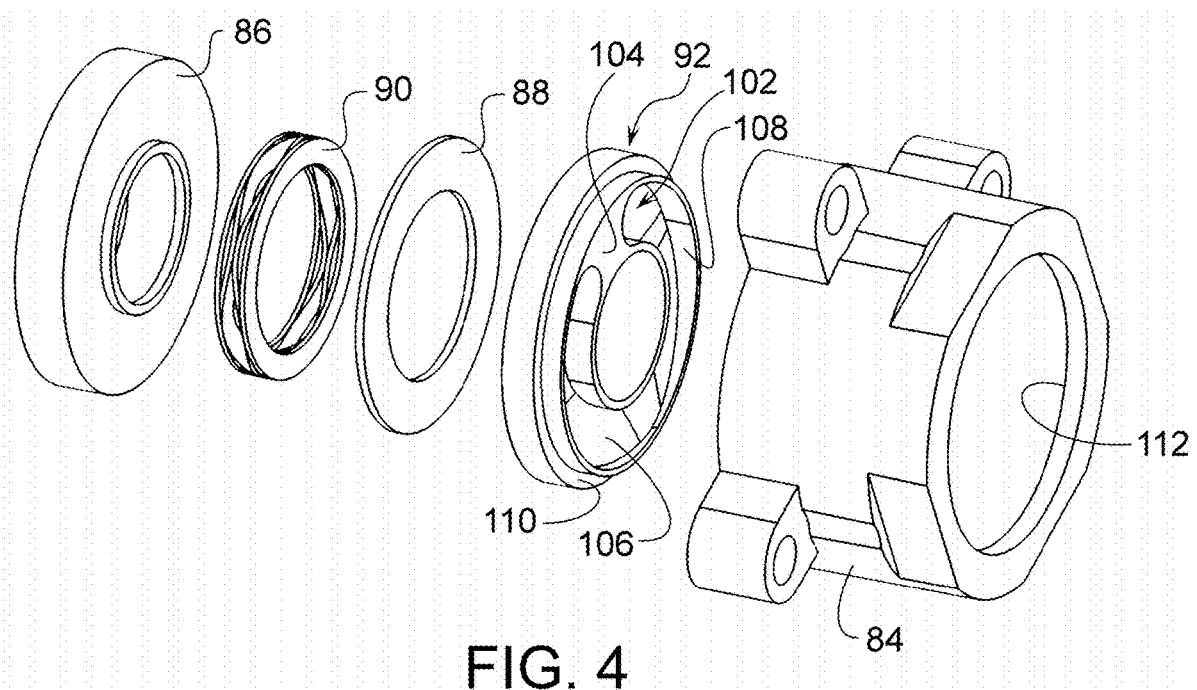
FIG. 4 illustrates an exploded view of the mechanical brake assembly according to various embodiments of the present disclosure.

FIG. 4 is another exploded view of the relatively stationary portions of the mechanical brake assembly 60. For instance, the relatively stationary portions include all the components of the mechanical brake assembly 60 except for the male disk 94.

Figure 9:
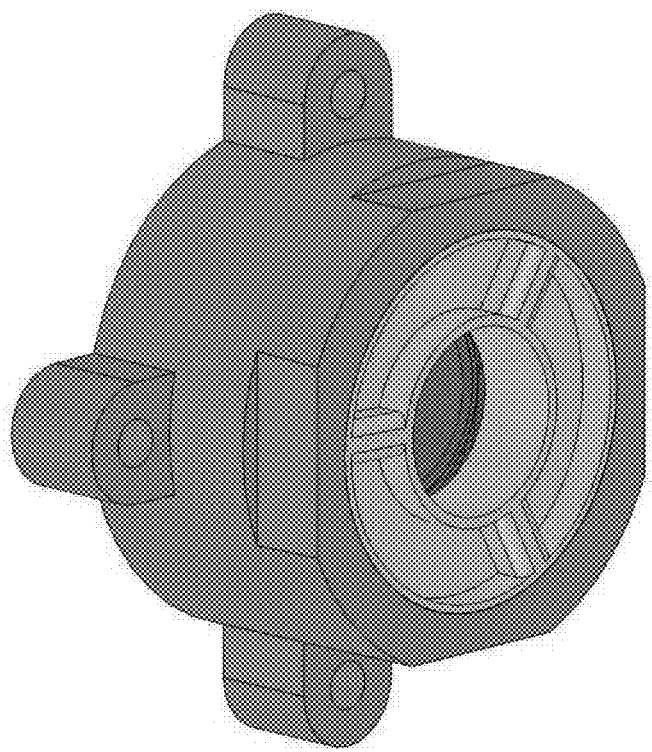
FIG. 9 illustrates an assembled view of the non-backdrivable brake assembly of the present disclosure.

The female disk 92, as shown in detail in FIG. 4, includes a groove 102 that extends in a circular direction almost entirely around the axis of the female disk 92. The groove 102 terminates in an abutment 104. In alternative embodiments, the female disk 92 may include multiple grooves and multiple abutments around its axis, such as having three abutments that are equally spaced 120 degrees from each other as shown in FIG. 9. According to the illustrated embodiment, the groove 102 has a depth that varies. For example, the depth of the groove 102 next to the abutment 104 may have the greatest depth, while positions further from the abutment 104 may have a more shallow depth.

The groove includes a bottom surface 106, whereby the term "bottom" refers to an orientation in which the female disk 92 is laid flat with the top of the groove 10 positioned upward. The bottom surface 106 is configured with a slope such that the depth of groove 102 varies inversely with the distance from the abutment 104. The groove 102 also includes a wall 108.

Figure 5:
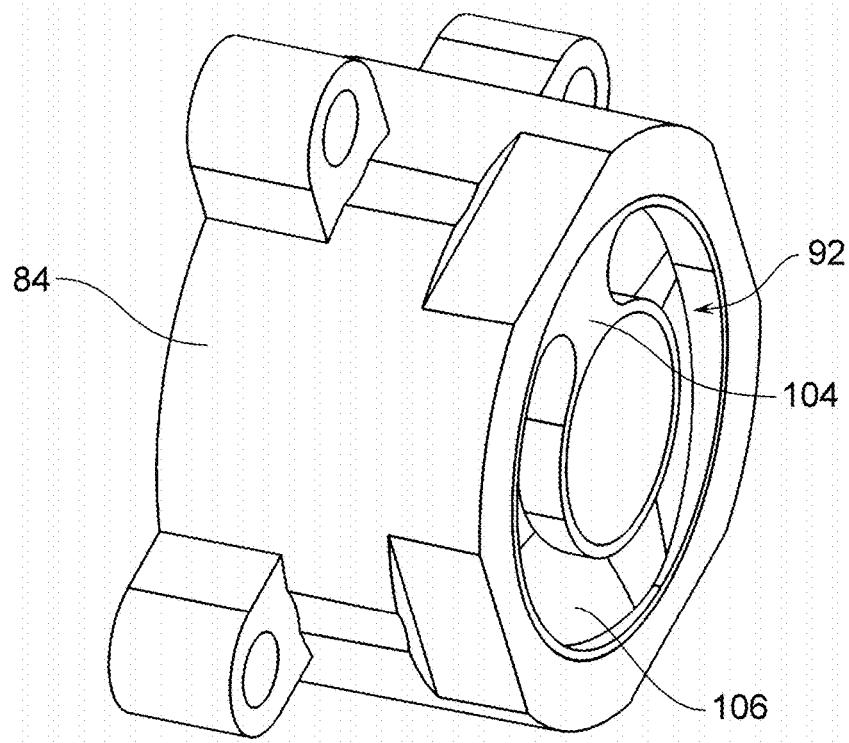
FIG. 5 illustrates a view of the assembled mechanical brake assembly according to embodiments of the present disclosure.

Furthermore, the female disk 92 includes a ridge 110 at an outer periphery of the female disk 92. When assembled, the ridge 110 is pressed up against an inner surface 112 near the front of the housing 84. FIG. 5 illustrates a view of the assembled mechanical brake assembly 60, with the female disk 92 pressed up against the inner front surface 112 of the housing 84.

When power to the motor 12, via electrical conductors 14, 16, 18, is cut off, the rotor 20 is moved backward by the front spring 66. When the male disk 94 is moved backward correspondingly with the rotor 20, the projection 100 of the male disk 94 (being aligned with the groove 102 of the female disk 92) continues for a short time rotating within the groove 102 until the projection 100 is deep enough in the groove 102 to encounter the abutment 104, at which point the projection 100 (and consequently the rotor 20 and shaft 22) comes to a stop.

As the projection 100 moves toward the female disk 92 when the motor 10 is turned off, the projection 100 may first contact a top portion of the abutment 104. In this event, the projection 100 may temporarily skip on the upper surface of the abutment 104 before entering the groove 102. It should again be noted that the "upper" surface refers to the surface on the right side of female disk 92 as shown in the views of FIGS. 4 and 5. This surface may be substantially perpendicular to the longitudinal axis of the shaft 22 and mechanical brake assembly 60. Again, once the projection 100 enters the groove 102 travelling in a first direction, the projection 100 will bump up against the abutment 104 to stop the rotation and prevent a back-driving force.

After the motor 10 has been braked and a reverse power is applied to the motor 10, the projection 100 will move away from the abutment 104 and be assisted in a forward direction by the slope of the bottom surface 106 of the groove 102 and further assisted forward by the rear spring 64.

When assembled as shown in FIG. 5, the female disk 92 is held in place by friction created by the force of the compression spring on the back of the female disk 92 and friction of the ridge 110 on the front of the female disk 92 against the inner front surface 112 of the brake housing 84. However, based on the characteristics of the components 84, 86, 88, 90, 92, the female disk 92 may have the ability to rotate slightly and provide a steady but quick deceleration of the rotation of the rotor 20. Since the rotor 20 may be rotating at about 2800 rpm, the impact of the projection 100 onto the abutment 104 may cause the female disk 92 to rotate slightly, depending on various factors, such as the compression strength of the compression spring 90. This impact force can be absorbed to some degree by the compression spring 90.

This flexibility to allow a more natural deceleration can help to extend the life of the components of the mechanical brake assembly 60. In the lab, the mechanical braking assembly 60 has been tested. According to the tests, it has been calculated that 6 inch-ounces of torque on the mechanical brake assembly 60 may equate to over 1000 inch-pounds of torque on the output shaft 33 through the gearing shown in FIG. 1. Therefore, a back-driving force on the output shaft 33 should not be able to move the female disk 92 significantly from its position within the housing 84. Nevertheless, if the female disk 92 were to remain fixed within the housing 84, the plastic pieces may tend to break more easily. Thus, with the slight rotation of the female disk 92, the life of the components can be extended, thereby requiring less or zero maintenance and repair that might normally be needed when conventional systems arrange breakable pieces in a stationary manner.

The mechanical brake assembly 60 of the present disclosure provides consistent performance as compared to other braking systems. When the present mechanical brake assembly 60 has been tested, it has been found that the mechanical brake assembly 60 held up well with little or no wear on its components. Even when tested through one million cycles (wherein each cycle involves a valve opening action and a valve closing action), the wear on parts was minimal. In fact, greater wear to components was found in conventional braking systems when tested through only 20,000 cycles.

Also, the mechanical brake assembly 60 is small and compact and can fit within an interior space of the support structure (i.e., within the bearing bracket assembly 40 shown in FIG. 1), whereby conventional braking systems may require much more space and may require placing parts outside of such a support structure. For example, the mechanical brake assembly 60 may be very small compared to clappers, solenoids, and/or electro-magnetic brakes. Thus, the cost to manufacture the mechanical brake assembly 60 may be about four time less expensive than conventional brakes.

Another advantage of the embodiments of the present disclosure is that the mechanical brake assembly 60 does not produce as much heat as is generated in conventional braking systems and is therefore more efficient. Also, the mechanical brake assembly 60 of the present disclosure does not cause any forces on the shaft that would cause the shaft to be distorted.

Figure 6:
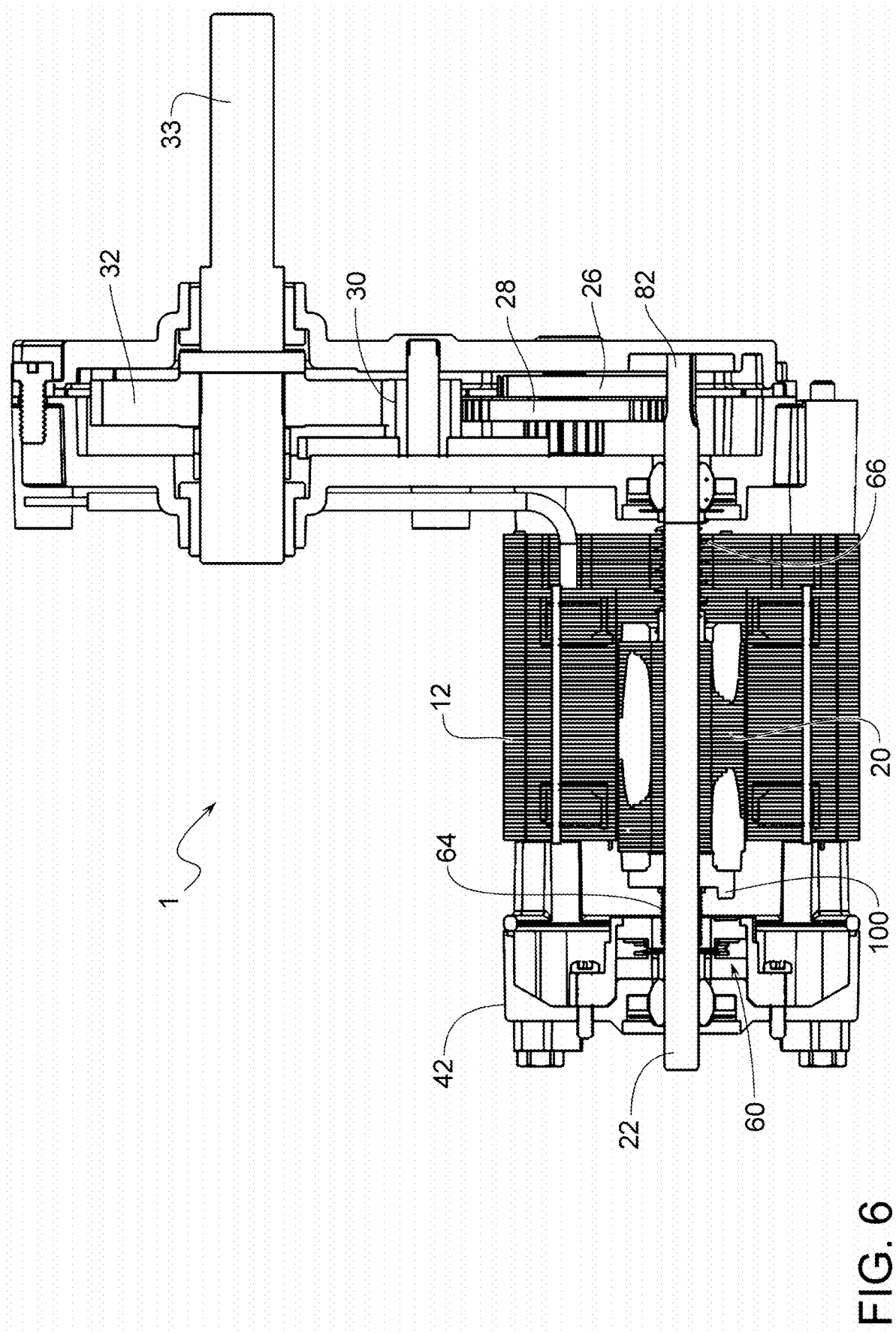
FIG. 6 illustrates a cross-sectional side view of the system of FIG. 1 when the motor is operating and the mechanical brake assembly is disengaged, according to some embodiments of the present disclosure.

FIG. 6 shows a cross-sectional side view of the system 1 of FIG. 1 when the system 1 is assembled and when the motor 10 is operating. During the time when the motor 10 is running, the mechanical brake assembly 60 is disengaged. In other words, the projection 100 of the male disk 94 is separated from the rest of the mechanical brake assembly 60 and the rotor 20 and shaft 22 are allowed to rotate without interruption.

When the motor 10 is in operation, the rotating rotor 20 is configured to naturally attempt to move itself with respect to the stationary stator 12 such the laminations of the rotor 20 and stator 12 are aligned. The rear spring 64 also provides sufficient force to bias the rotor 20 to a more central location within the stator 12.

The rotation of the shaft 22 results in the hobbed pinion 82, engaged with the first stage gear 26, to rotate the first stage gear 26. Rotation of the first stage gear 26 in turn rotates the second stage gear 28, and so on such that the output shaft 33 will be rotated.

Figure 7:
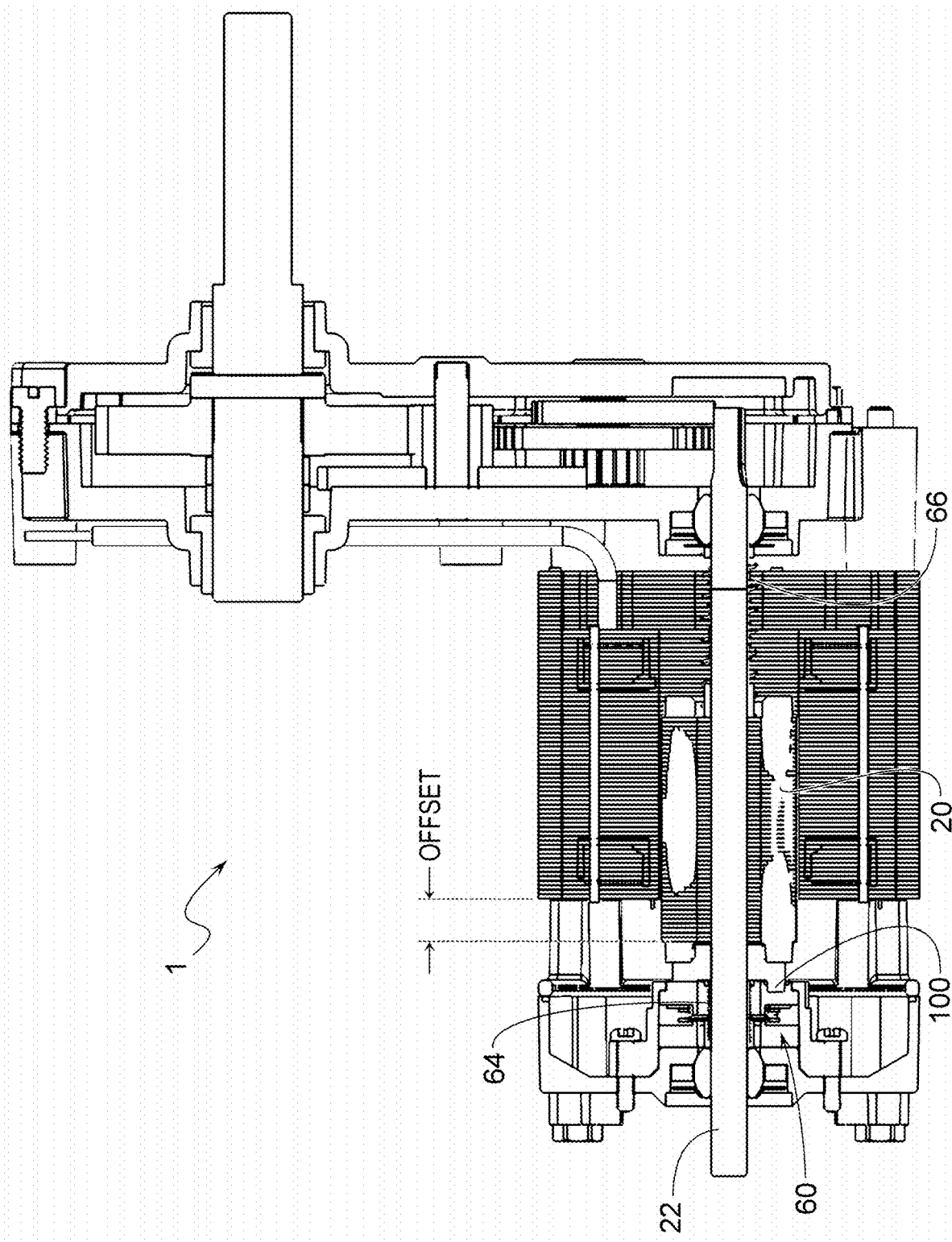
FIG. 7 illustrates a cross-sectional side view of the system of FIG. 1 when the motor is not operating and the mechanical brake assembly is engaged, according to some embodiments of the present disclosure.

When the stationary stator coils are energized, the magnetic field creates rotary motion to the rotor 20. This magnetic field also creates a path that aligns the stationary stator to the rotating rotor's laminations so that the rotor 20 moves forward as it rotates and aligns with the stator laminations, which disengages the brake, as shown in FIG. 6. However, as the motor 10 is de-energized, the magnetic field collapses and the front spring 66 pushes the rotor assembly back towards the brake, as shown in FIG. 7.

Run Position (Brake Disengage)

As shown in FIG. 6, when the stationary stator coils are energized, the magnetic field creates rotary motion to the rotor. This magnetic field also creates a path that aligns the stationary stator to the rotating rotor's laminations so that the rotor moves forward as it rotates and aligns with the stator lamination, which eventually disengages the brake.

Figure 8:
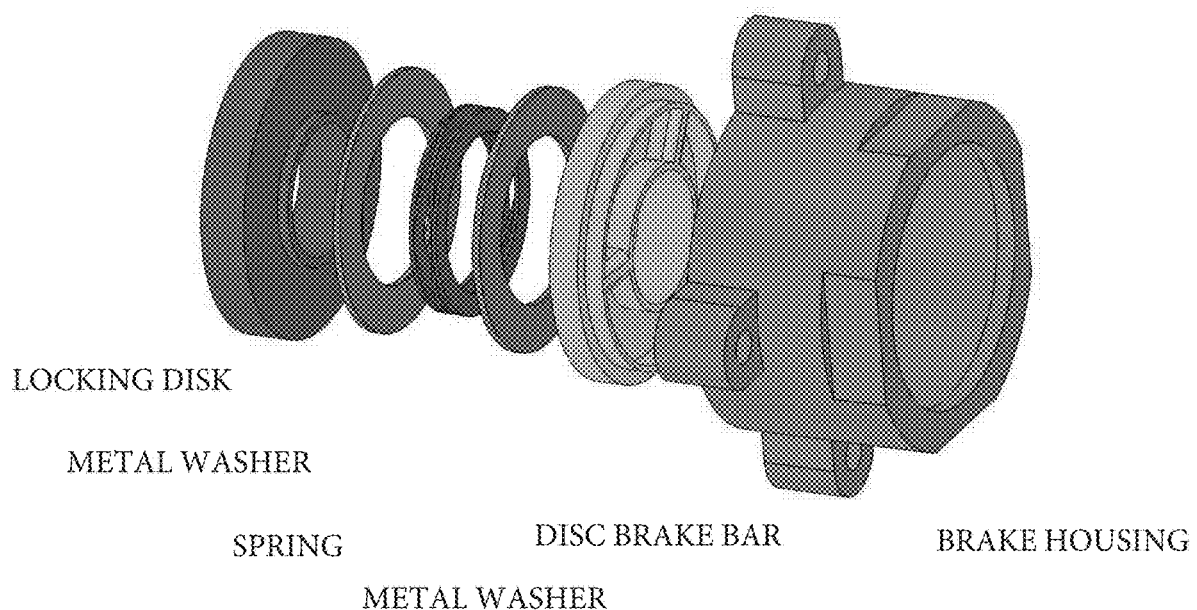
FIG. 8 illustrates an exploded view of a non-backdrivable brake assembly of the present disclosure.

As the motor is de-energized the magnetic field collapses, and the spring pushes the rotor assembly back towards the brake. The pin, which was attached to the rotor, hits the disc brake bar and the motor stops instantly (FIG. 8). The brake is also locked in place and the output shaft can no longer be back-driven.

The non-back-drivable mechanical brake assembly of the present disclosure includes the following components:

a brake housing which contains all the parts of the assembly (see FIG. 8);

a disc brake bar/abutment which can be configured to have multiple (1, 2, 3, 4, etc.) bars or abutments as mentioned previously. As described above, the disc brake bar may include a single abutment. In one embodiment, the disc brake bar may contain three bars (abutments) equally spaces at 120 degrees apart as is shown in FIG. 9, which may serve the same purpose as discussed above;

a metal washer which may include one piece or two pieces positioned in each side of the compression spring, which provides the cushion and sliding motion of the disc bar without being scratched by the spring;

a spring which provides the torque to rotate the disc bar, whereby the further the compression, the higher the torque to rotate the spring;

a locking washer which provides the lock as it pressed into the brake housing the deeper it is pressed the more compression it provides to the spring and the higher torque it generates.

It should be noted that one or more of the components may not be required and also that there may be other components other than those selected from the above listing.

FIG. 7 is a cross-sectional side view of the system 1 of FIG. 1 when the motor is not operating and the mechanical brake assembly is engaged. When power to the stator 12 is cut off, the rotor 20 is no longer affected by the magnetic field to align the laminations of the rotor 20 with the laminations of the stator 12, thereby resulting in the rotor 20 moving back to an equilibrium (steady state) position created by the rear spring 64 and front spring 66. For instance, the forces exerted by the front spring 66 will cause the rotor 20 to move back to a position such that the projection 100 of the male disk 94 engages with the female disk 92 to stop the rotation of the shaft 22 and rotor 20.

The projection 100 attached to the rotor 20 hits the abutment 104 of the female disk 92 to stop the motor 10 instantly. The brake is also locked in place and the output shaft 33 can no longer be back-driven.

Thus, the motor 10 is configured in a normally locked position when the motor 10 is de-energized and not in motion and when the brake is engaged. In the locked position, the rotor laminations are configured to be offset (not in alignment) with respect to the stator laminations, as shown in FIG. 7. The brake will remain engaged when the motor 10 is off thereby preventing the output shaft 33 to be back-driven.

Stop Position (Brake Engage)

As shown in FIG. 7, the motor is configured in a normally locked position (BRAKE ENGAGE) when the motor is not in motion or energized. The rotor and input pinion shaft assembly consist of a cast rotor, an input shaft with a multi-tooth pinion and, a pin (having a diameter of approximately 0.093 inches) pressed fitted onto the cast rotor. The rotor and input pinion shaft assembly is pressed all the way back towards the brake assembly via a spring. The rotor lamination is configured to be offset (not in line) against the stator lamination. The brake will engage when the motor is off and the pin moves toward the brake and engages the brake bar (3 bars) thereby preventing the output shaft to be back driven. The term "bar" (as referred to herein) refers to the abutment described above.

Therefore, according to the embodiments described above, mechanical brake assemblies for electric motors may be provided. One embodiment includes a mechanical brake assembly (e.g., the mechanical brake assembly 60) comprising a female disk (e.g., the female disk 92) including a curved groove (102) and an abutment (104). The mechanical brake assembly in this embodiment further includes a male disk (e.g., the male disk 94) including a projection (100). The male disk 94 is attached to the rotor 20 of the electric motor 10. When the electric motor 10 is energized, the projection 100 of the male disk 94 is allowed to rotate uninterrupted with the rotation of the rotor 20 of the electric motor 10. When the electric motor is not energized, the projection 100 of the male disk 94 travels within the curved groove 102 of the female disk 92 and abuts the abutment 104 of the female disk 92, thereby stopping the rotation of the rotor 20 of the electric motor 10.

Furthermore, this embodiment may be further defined such that the curved groove 102 of the female disk 92 is a near-circular groove that terminates at the abutment 103. The curved groove 102 may have a variable depth. The depth of the curved groove 102 may vary inversely with respect to the distance from the abutment 104. The projection 100 may have sloped walls and an arched cross-sectional shape. When the projection 100 of the male disk 94 abuts the abutment 104 of the female disk 92 to stop the rotation of the rotor, the mechanical brake assembly may prevent the motor from back-driving.

The mechanical brake assembly, according to this embodiment, may further be defined to include the housing 84, the disk stop 86, the compression spring 90, and at least one washer 88, wherein the compression spring 90 and at least one washer 88 are positioned between the disk stop 86 and the female disk 92 within the housing 84. The housing 84 may include ears 97 for allowing the housing 84 to be attached to the bearing bracket assembly 40, which supports the mechanical brake assembly 60 and electric motor 10. The female disk 92 may be further configured to include the ridge 110 that is pressed against the inner front surface 112 of the housing 84 by the compression spring 90. When the projection 100 of the male disk 94 initially abuts the abutment 104 of the female disk 92, the female disk 92 is configured to rotate up to about 1° with respect to a longitudinal axis of the female disk 92.

According to additional embodiments, an AC (PSC) reversible motor is defined in the present disclosure and may be attached to the mechanical brake assembly 60 as defined above. The PSC reversible motor may comprise the shaft 22 mechanically engaged with the gear assembly 24. The PSC reversible motor and gear assembly 24 may be configured to control a closing component of a valve actuator.

Furthermore, methods for braking a motor are described. According to one embodiment, a method of operating an electric motor is defined for a motor having a rotor and a stator axially offset from each other in a steady state. The method may include the steps of providing electrical power to a stator of an electric motor to create a magnetic field and applying a first force on a rotor of the electric motor to move the rotor in a first direction along an axial path to achieve a greater extent of alignment with the stator. Moving the rotor to achieve the greater extent of alignment causes a projection of a male disk attached to the rotor to exit a groove of a female disk to allow uninterrupted rotation of the rotor. When electrical power is no longer provided to the stator, the method further comprises the step of applying a second force on the rotor to move the rotor in a second direction opposite to the first direction to cause the projection to enter the groove of the female disk and abut an abutment of the female disk, thereby stopping the rotation of the rotor of the electric motor.

It should be noted that various changes and modifications to the presently preferred embodiments described herein will be apparent to those skilled in the art. Such changes and modifications may be made without departing from the spirit and scope of the present disclosure and without diminishing its attendant advantages. Further, references throughout the specification are non-limiting and it should be noted that claim limitations presented herein are not meant to describe the invention as a whole. Moreover, the invention illustratively disclosed herein suitably may be practiced in the absence of any element which is not specifically disclosed herein.

What is claimed is:

1. A mechanical brake assembly for an electric motor, the mechanical brake assembly comprising:
   a female disk including a groove and an abutment; and
   a male disk including a projection, the male disk being in mechanical communication with a rotor of the electric motor;
   a compression spring to apply a force to the female disk;
   a disk stop,
   wherein the compression spring is positioned between the disk stop and the female disk,
   wherein, when the electric motor is de-energized, the projection of the male disk is configured to travel within the groove of the female disk and abut the abutment of the female disk, thereby reducing the rotation of the rotor of the electric motor.

2. The mechanical brake assembly of claim 1, wherein the groove of the female disk comprising a curved groove that terminates at the abutment.

3. The mechanical brake assembly of claim 1, wherein the groove has a variable depth.

4. The mechanical brake assembly of claim 3, wherein the depth of the groove varies inversely with respect to the distance from the abutment.

5. The mechanical brake assembly of claim 1, wherein the projection has sloped walls and an arched cross-sectional shape.

6. The mechanical brake assembly of claim 1, wherein, when the projection of the male disk abuts the abutment of the female disk to stop the rotation of the rotor, the mechanical brake assembly prevents the motor from back-driving.

7. The mechanical brake assembly of claim 1, further comprising:
a housing;
a disk stop;
the compression spring; and
at least one washer,
wherein the compression spring and at least one washer are positioned between the disk stop and the female disk within the housing.

8. The mechanical brake assembly of claim 7, wherein the housing includes ears for allowing the housing to be attached to a bearing bracket assembly, which supports the mechanical brake assembly and electric motor.

9. The mechanical brake assembly of claim 7, wherein the female disk further includes a ridge that is pressed against an inner front surface of the housing by the compression spring.

10. The mechanical brake assembly of claim 9, wherein, when the projection of the male disk initially abuts the abutment of the female disk, the female disk is configured to rotate up to 1° within a plane perpendicular to a longitudinal axis of the female disk.

11. An alternating-current (AC) permanent split capacitor (PSC) reversible motor attached to the mechanical brake assembly of claim 1.

12. The AC PSC reversible motor of claim 11, comprising a shaft mechanically engaged with a gear assembly.

13. The AC PSC reversible motor of claim 12, wherein the AC PSC reversible motor and gear assembly are configured to control closing and opening operations of a valve actuator.

14. A method of operating an electric motor having a rotor and a stator axially offset from each other in a steady state, the method comprising:
providing electrical power to a stator of the electric motor to create a magnetic field;
applying a first force on a rotor of the electric motor to move the rotor in a first direction, causing a projection of a male disk attached to the rotor to allow rotation of the rotor; and
applying, when electrical power is no longer provided to the stator, a second force on the rotor in a second direction to cause (1) the projection to enter a groove of the female disk and abut an abutment and (2) a compression spring to apply a force to reduce rotation of the female disk, thereby reducing the rotation of the rotor of the electric motor.

15. The method of claim 14, wherein the groove of the female disk is a near-circular groove that terminates at the abutment.

16. The method of claim 14, wherein causing the projection of the male disk to abut the abutment of the female disk to thereby stop the rotation of the rotor further comprises preventing the motor from back-driving.

17. A mechanical brake assembly for an electric motor, the mechanical brake assembly comprising:
a first disk including a groove and an abutment, wherein the groove has a variable depth;
a second disk including a projection; and
a clutch to apply a force to an independent disk which is configured to rotate independent of a rotor of the electric motor, the independent disk being either the first disk or the second disk,
wherein, when the electric motor is de-energized, the projection of the second disk is configured to travel within the groove of the first disk and abut the abutment of the first disk, thereby slowing the rotation of the rotor of the electric motor.

18. The mechanical brake assembly of claim 17, wherein the clutch comprises one of a compression spring or a wavy washer.

19. The mechanical brake assembly of claim 1, wherein the compression spring is configured to apply a frictional force against the female disk, thereby acting as a clutch.

20. The mechanical brake assembly of claim 17, wherein the depth of the groove varies inversely with respect to the distance from the abutment.

* * * * *